United States Patent [19]

Olsen

[11] 4,266,993
[45] May 12, 1981

[54] METHOD FOR THE SEALING OF A COVER STRIP ONTO PACKING CONTAINERS

[75] Inventor: Jan-Erik Olsén, Malmö, Sweden

[73] Assignee: Tetra Pak International AB, Lund, Sweden

[21] Appl. No.: 35,348

[22] Filed: May 2, 1979

[30] Foreign Application Priority Data

May 2, 1978 [SE] Sweden ............................ 7805004

[51] Int. Cl.³ ...................... B29C 27/02; B65B 61/18
[52] U.S. Cl. ................................ 156/69; 53/137;
156/73.1; 156/308.2; 156/311
[58] Field of Search ............ 156/69, 73.1, 514, 580.1,
156/580.2, 581, 583.1, 308.2, 311, 252; 53/137

[56] References Cited

U.S. PATENT DOCUMENTS

| | | | |
|---|---|---|---|
| 2,303,198 | 11/1942 | Cunnington | 156/581 |
| 3,287,878 | 11/1966 | Mobley | 156/514 |
| 3,361,611 | 1/1968 | Stark | 156/514 |
| 3,471,351 | 10/1969 | Fuchs | 156/514 |
| 3,525,454 | 8/1970 | Frederiksen | 156/73.1 |
| 3,905,280 | 9/1975 | Egleston et al. | 156/580.1 |
| 3,912,576 | 10/1975 | Braun | 156/581 |
| 3,937,645 | 2/1976 | Ascoli et al. | 156/581 |
| 3,988,195 | 10/1976 | Henderson | 156/514 |
| 4,167,092 | 9/1979 | Medwed | 156/581 |

Primary Examiner—Michael G. Wityshyn
Attorney, Agent, or Firm—Burns, Doane, Swecker & Mathis

[57] ABSTRACT

A method for the sealing of a cover strip onto packing containers, in particular non-returnable containers for liquid foodstuffs, which containers are of the type which are manufactured from laminated material comprising layers of, among others, thermoplastics, is disclosed. Packing containers of this type are generally provided with an opening arrangement in the form of a pouring opening punched out in the top side of the container, which is covered by a tear-off cover strip. The cut edge extending around the pouring opening is in this case situated inside the container which makes necessary special measures in order to prevent the occurrence of bacteria-collecting corners and pockets. This is a problem in particular in the relatively thick type of packing laminate which comprises layers of foamed thermoplastic material. It is often also necessary to seal off the free cut edge, since the laminate occasionally comprises layers which for various reasons must not come into contact with the contents. The difficulties are overcome in accordance with the invention in that the thermoplastic layers in the edge areas of the laminate adjoining the pouring opening are melted and made to flow over the edge and are joined on the one hand to one another, and on the other hand to the side of the cover strip facing towards the package. This is achieved by simultaneously heating and compressing the actual material area with the help of a mandrel and a holding-up tool and subjecting the material area to ultrasound.

5 Claims, 3 Drawing Figures

METHOD FOR THE SEALING OF A COVER STRIP ONTO PACKING CONTAINERS

The present invention relates to a method for the sealing of a cover strip onto a packing container and an arrangement for the realization of the method.

Packing containers of the non-returnable type for the packing of liquid foodstuffs, e.g. milk and juice, are manufactured at present mostly from laminated material. The outer layer of the laminate consists most frequently of thermoplastics, since thermoplastics, beside rendering the laminate impermeable to liquid, also makes possible the heat-sealing of the laminate when the sealing fins are formed which are necessary for the conversion of the laminate to packing containers.

Between the two outer thermoplastic layers further laminate layers are present which serve various purposes, e.g. fibre material of foamed thermoplastic material to increase the rigidity of the packing laminate, aluminium foil or a film of polyvinyl alcohol to increase the impermeability to gas of the material. The outer thermoplastic layers of the laminated material normally prevent the inner layers of the laminate from coming into contact with the contents, which is undesirable since certain of the layers should, if possible, not be subjected to the contents, the fibre layer for instance because the fibre material absorbs the contents or the aluminium layer because aluminium reacts with certain contents.

Packing containers of this type are sometimes furnished with an opening arrangement in the form of a pouring opening punched out of the material, which prior to the conversion of the material to individual packing containers is covered with a tear-off cover strip which is sealed to the outer thermoplastic layer. As a result the cut edges of the material defining the pouring opening will be inside the packing container and will thus come into contact with the contents, which, as mentioned above, is usually not desirable. It has been endeavoured up to now to solve this problem by applying a second cover strip to the inside of the packing container, which strip is sealed on the one hand to the inside of the packing material around the emptying opening, and on the other hand to the outer cover strip in the actual emptying opening. As a result the cut edge is safely screened off the inside of the packing container, but the cover strip situated inside the container constitutes an unwelcome addition which makes the manufacture of the opening arrangement more expensive and more difficult and which moreover increases the risk of a formation of pockets and recesses wherein contaminations and bacteria may remain. This risk is particularly great when the packing container is made of the type of laminated material which comprises layers of foamed plastic material, since such laminate is relatively thick and thus represents greater risks of pocket formations.

It is an object of the present invention, therefore, to provide a method which makes possible the manufacturing of an opening arrangement of the type described above without being subject to the disadvantages of the earlier methods in the form of expensive and awkward-to-handle loose strips on the inside of the packing container or increased danger of the formation of pockets and recesses wherein bacteria and dirt can accumulate.

It is a further object of the present invention to provide a method for the sealing of a cover strip over an opening in a packing container laminate according to which the laminate edge surrounding the opening is sealed so that the inner layer of the laminate is covered by thermoplastic material whilst the edge is converted so that the occurrence of pockets or cavities is prevented.

It is a further object of the present invention to achieve a solution of the abovementioned problem according to which the layers of thermoplastics incorporated in the packing laminate are used for sealing of the cut edge as well as for sealing of the cover strip.

These objects have been achieved in accordance with the invention in that a method for the sealing of a cover strip over an opening in a packing container wall of laminated material has been given the characteristic that two or more thermoplastic layers incorporated in the material are joined to the cover strip in that the edge of the opening as well as an area of the laminated material adjoining this and the cover strip are heated with simultaneous compression to a temperature exceeding the softening temperature of the thermoplastic material, so that the thermoplastic layers are caused to flow over the edge and are joined to one another as well as to the cover strip. In this manner a supple, narrow material edge appears which is covered by homogeneous thermoplastic material which has flowed out and is joined by the same directly to the material of the cover strip.

A preferred embodiment of the method in accordance with the invention has been given the further characteristic that the heating takes place by subjecting the material to ultrasound of such an intensity and frequency that the thermoplastic material softens. The heating by ultrasound makes possible a rapid attainment of the desired temperature without any risk of local overheating of the material.

A further embodiment of the method in accordance with the invention has been given the further characteristic that the effect of the ultrasound is interrupted when the thermoplastic layers have softened, whereupon the heating area of heated material is cooled with continued compression. The cooling with compression ensures that the material edge retains the shape obtained at the same time as good adhesion of the cover strips is assured.

A further embodiment of the method in accordance with the invention has been given the further characteristic that the material is heated to a temperature of 150°–200° C. This temperature interval has proved to be suitable in order to obtain the desired flowing out of the thermoplastic materials used most commonly.

It is also an object of the present invention to provide an arrangement for the realization of the method in accordance with any one of the preceding objects. A preferred embodiment of such an arrangement has been given the characteristic that it comprises a compression device with a working surface which corresponds to the material area which is to be treated, a holding-up tool to co-operate with the compression device, driving elements for the controllable pressing of the compression device against the holding-up tool and elements for the generation of ultrasound.

An embodiment of the arrangement in accordance with the invention has been given the further characteristic that the holding-up tool has a profiled working surface. This prevents the occurrence of a complete pressing out of the plastic material at high compression forces and/or temperatures.

A further embodiment of the arrangement in accordance with the invention has been given the further characteristic that the working surface of the holding-up tool has a profile depth of 0.05–0.4 mm, preferably 0.2 mm.

A further embodiment of the arrangement in accordance with the invention has been given the further characteristic that the element generating ultrasound is arranged in the compression device.

A further embodiment of the arrangement in accordance with the invention has been given the further characteristic that the working surface of the compression device is annular.

BRIEF DESCRIPTION OF THE DRAWINGS

A preferred embodiment of the method and the arrangement in accordance with the invention will now be described in more detail with special reference to the enclosed schematic drawing which shows in strong enlargement various sections through an opening arrangement on a packing container, which opening arrangement comprises a pouring opening and a strip covering the same wherein.

DETAILED DESCRIPTION OF THE PREFERRED EMBODIMENT

Figure 1:
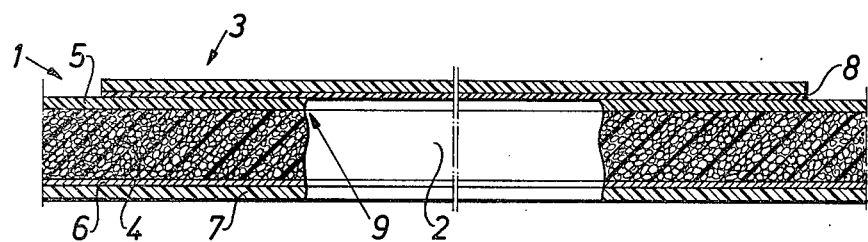
FIG. 1 shows the opening arrangement before the carrying out of the method in accordance with the invention.

In FIG. 1 is shown a cross-section through a packing container 1, wherein a pouring opening 2 is provided. Over the pouring opening a cover strip 3 is applied on the outside of the packing container wall. The packing container wall 1 consists of a laminated material which comprises a carrier layer 4 of a thickness of substantially 0.8 mm. The carrier layer 4 consists of foamed thermoplastics, e.g. polystyrene. On the side of the carrier layer 4 which faces towards the outside of the packing container there is a layer 5 of homogeneous thermoplastics, e.g. polystyrene. The layer 5 has a thickness of approx. 0.1 mm. On its surface facing the inside of the packing container two further layers are laminated to the carrier layer, namely, a layer 6 of aluminium foil and a layer 7 situated outside this layer consisting of homogeneous plastic material, e.g. polystyrene. The layer 7, like the layer 5 is of a thickness of substantially 0.1 mm.

The type of laminate described is used for the manufacture of packing containers, e.g. for wine and has a number of characteristics appropriate for this purpose, e.g. great rigidity and good impermeability to liquid as well as gas. These characteristics are due to the special make-up and the rigidity which are achieved mainly because the homogeneous plastic layers 5,7, owing to the relatively great thickness of the carrier layer 4, are situated at such a distance from one another that great resistance against bending arises, similarly to what happens e.g. in I-beams. The homogeneous plastic layers 5,7 moreover ensure good impermeability to liquid whilst the layer of aluminium foil 6 situated between the inner plastic layer 7 and the foam layer 4 minimizes the impermeability to gas of the material which is particularly important in the packaging of wine or sterilized products, e.g. sterilized milk or juice.

The emptying opening 2 provided in the material by punching, cutting or the like is covered by means of the tear-off cover strip 3, which is applied over the pouring opening on the outside of the packing container wall 1. The dimensions of the cover strip 3 are such that beside covering the actual emptying opening 2 it also covers a part of the area of packing container wall situated around the emptying opening, within which area the cover strip is also joined to the wall by glueing or by some other appropriate method. In the case described the sealing of the cover strip to the wall of the packing container may take place by heating and compression, since the cover strip made of polyvinyl chloride has a material layer 8 of polystyrene facing the packing container wall which by local heating e.g. by means of hot air may be softened and joined to the outer layer 5 of the packing container wall made of the same material.

The opening arrangement described with reference to FIG. 1 is customary in certain types of packing containers, but has certain disadvantages, first and foremost because pockets and recesses are likely to be formed between cover strip and the packing container wall at the "corners" 9 in the emptying opening facing the cover strip. This problem is accentuated in particular in the type of packing laminate described which comprises layers of foamed plastics, since this laminate is relatively thick and on cutting or punching tends to form a relatively uneven cut surface. It is also frequently found that the different layers incorporated in the laminate are exposed in the actual cut surface around the emptying opening to the inside of the packing container which is a disadvantage from a point of view of hygiene, since the foam layer 4 in the cut surface presents a great number of fine channels and cavities wherein bacteria can accumulate. Moreover, the foam layer, as mentioned previously, is not gas-tight. Furthermore, the layer 6 of aluminium foil should not come into contact with certain types of contents, e.g. wine, since aluminium reacts with certain components in the wine, e.g. sulphur and acids.

To overcome these disadvantages it is possible in a known manner applied previously to provide the emptying opening with a further cover strip which is placed on the side of the packing container laminate facing the inside of the packing container and is sealed to this round emptying opening and to the external cover strip 3 in the actual emptying opening, this latter portion of the inner strip accompanying the outer strip when the packing container is opened by the removal of the outer strip. However, the application of the inner strip implies further disadvantages which have been referred previously and the present invention therefore offers instead a solution which involves a further treatment of the opening arrangement in accordance with FIG. 1.

Figure 2:
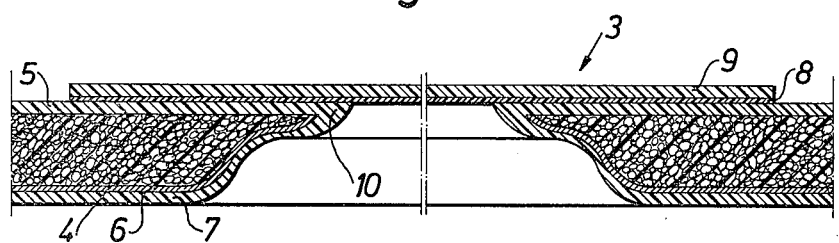
FIG. 2 shows the opening arrangement after processing in accordance with the method according to the invention.

The packing container laminate shown in FIG. 2 is identical in its make-up with that shown in FIG. 1 and thus comprises a central carrier layer 4 of foamed plastics, an aluminium layer 6 as well as homogeneous plastic layers 5 and 7 on the outside. The cover strip 3 also corresponds to the cover strip shown in FIG. 1 and thus consists of a laminate which comprises a layer 8 of polystyrene facing the packing container wall and a layer of polyvinyl chloride 15.

As can be seen from the drawing, the cut edge of the packing laminate facing towards the emptying opening has been treated so that it rests smoothly against the underside of the cover strip 3 at the same time as the edge has been sealed so that the two inner laminate layers 4 and 6 are not exposed to the inside of the packing container. This sealing of the cover strip is brought about in that the layers of thermoplastic material incorporated in the material, that is to say, the layers 4,5 and 7, are melted together so that they are all joined to one another and to the inside of the cover strip, either directly or indirectly via intermediate thermoplastic layers. This is done in that the packing material edge situated around the pouring opening 2 and the area of the laminate adjoining the same are simultaneously compressed and heated to a temperature which exceeds the softening temperature of the thermoplastics, as a result of which the thermoplastic layers are made to flow out over the original material edge and to coalesce so that they are joined to one another as well as to the layer 8 of the cover strip 3. As a result a material tongue 10 of homogeneous thermoplastic material situated close to the central part of the pouring opening 2 is produced, which largely derives from the original, foamed carrier layer 4. The tongue 10 encloses and covers the edge of the foamed carrier layer 4 as well as of the aluminium foil 6 and thereby effectively prevents these layers from coming into contact with the contents present in the container. In this way it is prevented that the contents are negatively affected by contact with the aluminium foil or penetrating gas, since the sealing of the edge surface of the foamed layer at the same time brings about an appreciable increased impermeability to gas.

Thanks to the smooth transition between the original material thickness and the thickness of the tongue 10 the occurrence of recesses or pockets, wherein contaminations and bacteria can accumulate and which, in the event of sterilization of the package, are very difficult effectively to sterilize, is prevented and since the inner surface of the packing material in the area of the emptying opening now consists wholly of homogeneous thermoplastic material, the problem of the fine channels or capillaries present in the original cut surface is also eliminated.

The conversion of the cut surface of the emptying opening 2 to the form as shown in FIG. 2 is achieved, as mentioned above, in that the packing laminate as well as the cover strip are subjected to a simultaneous heating and compression. This is done more particularly in that the material layers are compressed at the same time as they are subjected to ultrasound of such intensity and frequency that the thermoplastic material softens and flows out to form the tongue 10. When the thermoplastic layers consist of polystyrene the desired result is obtained if the material layers are compressed with a force of 50 kg/cm² at the same time as the thermoplastic layers are heated to a temperature of 150°–200° C.

Figure 3:
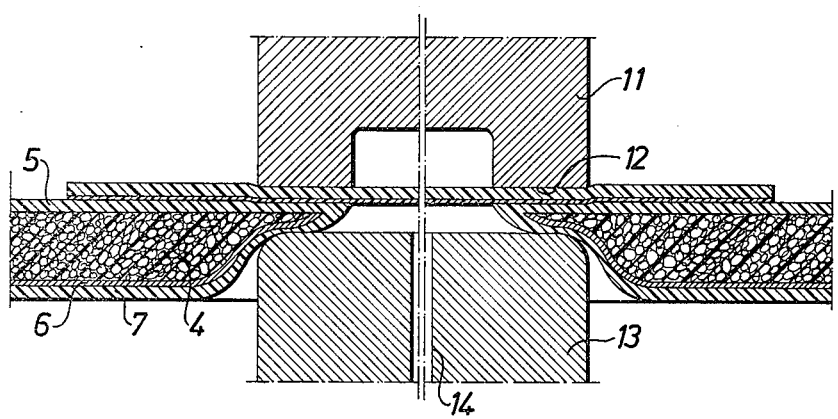
FIG. 3 shows the opening arrangement according to FIG. 2 during processing in accordance with the method according to the invention and illustrates also parts of the arrangement according to the invention which are essential for the understanding of the invention.

The conversion of the material edge is achieved in accordance with the invention with the help of an arrangement whose active parts are shown in FIG. 3. The packing material shown in FIG. 3, like the cover strip, is identical in its make-up with that described and shown earlier. However, in FIG. 3 the material is shown at the moment of forming when it is simultaneously heated and compressed with the help of the arrangement in accordance with the invention which comprises a compression device 11 with a working surface 12, a holding-up tool 13 and driving elements (not shown) for the displacement of the compression device in the direction towards or away from the holding-up tool and for the generation of the desired compressive force together with elements for the generation of ultrasound. The compression device 11 has the form of a mandrel at whose end is situated the working surface 12. The working surface is substantially annular with an outside diameter which corresponds to the outside diameter of the area of the packing material wall which is to be compressed and an inside diameter which corresponds to the inside diameter of the said area. In the centre of the working surface a recess is provided in the compression device so as to prevent needless compression of the parts of the cover strip 3 which are situated over the emptying opening and thus are not to be joined to the packing container wall. The holding-up tool 13 has a cylindrical working surface whose diameter coincides with the outside diameter of the working surface 12. Centrally in the holding-up tool 13 is a duct 14 for the evacuation of air shut up in the space between the holding-up tool and the cover strip.

The element generating ultrasound can be a separate piece of equipment which is placed at a desired point, but it is appropriately built together with or arranged in the compression device 11 so that the ultrasound is transmitted via the compression device and the working surface to the material surface which is to be treated. This element generating ultrasound can be of a known design and is not therefore described in any detail.

The sealing of the cover strip is achieved whilst the packing material is still in plane shape, when it can be introduced in a simple manner between the compression device and the holding-up tool which are separated from one another. It is appropriate for the cover strip 3 to have been joined already earlier in a provisional manner to the packing container material in the correct position over the emptying opening. When the packing laminate as well as the cover strip have been brought onto the correct position between the compression device and the holding-up tool, the element generating ultrasound is started, at the same time as the compression device is moved in the direction towards the holding-up tool 13. When the compression device has come into contact with the cover strip 3 the heating of the material will commence immediately. The movement of the compression device towards the holding-up tool continues until the material layers have been pressed together with a predetermined force, preferably approx. 50 kg/cm². The material layers have then been pressed together to the position shown in FIG. 3 at the same time as the thermoplastic layers have been heated to a temperature of 150°–200° C. and have been induced to flow out over the original cut edge. After a total heating period of approx. 0.15 seconds the heating is interrupted by shutting off the generation of ultrasound. The pressure is maintained, however, for a further short period, approx. 0.1 seconds, during which time the material is allowed to cool down. The cooling is accelerated by the material being in contact with the compression device as well as with the holding-up tool which are both made of material with good thermal conductivity, e.g. metal. After the required cooling period the sealing is complete and the compression device is withdrawn from the material which can then be removed.

In order to prevent any negative effect on the cover strip or the molten thermoplastic material from the increasing air pressure in the space between the cover strip and the holding-up tool, this space is evacuated during the process with the help of the evacuating duct 14 which may open to atmosphere or be connected to an evacuation pump.

Practical experiments have shown that the amount of pressure applied as well as the temperature occasionally (i.e. with certain types or thicknesses of material) must be kept within very close limits for the desired result to be obtained. Thus, a number of experiments have failed because the temperature and/or the pressure have been set a little too high, which directly lead to the plastic layer to be compressed to such an extent that practically no plastic material remains between cover strip and aluminium foil, as a result of which adhesion and impermeability are impaired.

These difficulties are overcome in that the holding-up tool in a preferred embodiment of the arrangement in accordance with the invention is given a profiled working surface, e.g. a lettered surface or a surface with an annular or helical groove. The depth of profile should be 0.05–0.4 mm and preferably 0.2 mm whilst an advantageous value for the distance between grooves (recesses) was found to be approx. 0.5 mm. This design of the holding-up tool ensures that the portions of the laminate layers corresponding to the grooves or recesses are subjected to a limited compressive force whose magnitude is independent of the total compressive force and is determined instead by the depth of profile of the holding-up tool and to a certain measure by the thickness of laminate, that is to say, the quantity of material which is compressed in the grooves or recesses.

The profiling has proved to be very effective and makes possible a choice of pressure and temperature within considerably wider limits of tolerance than has been possible with a holding-up tool with a non-profiled, plain working surface. The light profiling which is imparted to the surface facing the inside of the packing container has been found to present no disadvantages.

The heating of the material edge in connection with the process in accordance with the invention can, of course, be carried out with the help of other methods, e.g. heating by means of hot air, etc. However, it is then much more difficult to obtain a uniform heating through the whole thickness of the material, since the foam material has a certain insulating effect and since moreover the aluminium layer conducts the heat away from the relatively confined space around the pouring opening which is to be heated. Furthermore, since by the use of such heating methods the material surfaces are heated to a higher degree than on heating with ultrasound, the risk of the material sticking or attaching itself to the compression device or the holding-up tool increases and brings about the chance of an inferior result of the sealing. Ultrasound also means that the sealing equipment, that is to say, the compression device and the holding-up tool, may be kept cool during the whole course of events and thus contribute to the cooling down after stoppage of the heating.

What is claimed is:

1. A method for sealing a cover strip over an opening in a packing container wall, said wall including at least a central layer arranged between first and second thermoplastic layers, and said central layer including a surface defining an outer boundary of said opening, which surface includes edges and cavities where bacteria may breed, comprising the steps of:

placing said cover strip over said opening in said packing container wall, in contact with said first thermoplastic layer;

heating said packing container wall about said opening until said thermoplastic layers are at a softening temperature;

compressing said packing container wall about said opening simultaneously with the heating step;

urging said second thermoplastic layer of said packing container wall at said opening toward said first thermoplastic layer until said second thermoplastic layer is joined both to said first thermoplastic layer and to the cover strip and said surface of said central layer is entirely covered by at least said second thermoplastic layer.

2. The method of sealing a cover strip according to claim 1 wherein the step of heating comprises heating by ultrasound at a preselected intensity and frequency to soften the thermoplastic layers.

3. The method of sealing a cover strip as in claim 1 further comprising the steps of:

terminating the heating of said packing container wall about said opening after a predetermined time; and continuing to compress said packing container wall about said opening while the thermoplastic layers cool.

4. The method of sealing a cover strip as in claims 1, 2, or 3 wherein said packing container wall about said opening is heated to a temperature of 150°–200° C.

5. The method of sealing a cover strip as in claim 3 further comprising the step of:

terminating the compressing of the packing container wall about said opening after a second predetermined period of time.

* * * * *